United States Patent [19]

Pridham et al.

[11] 4,170,766
[45] Oct. 9, 1979

[54] BEAMFORMER

[75] Inventors: Roger G. Pridham, Providence; Andrew C. Callahan, Newport; Ronald A. Mucci, Jamestown, all of R.I.

[73] Assignee: Raytheon Company, Lexington, Mass.

[21] Appl. No.: 873,042

[22] Filed: Jan. 27, 1978

[51] Int. Cl.$^2$ .......................... G01S 3/80; G01S 3/00
[52] U.S. Cl. ................................ 367/135; 343/113 R; 367/123; 367/103
[58] Field of Search ..................... 340/6 R, 3 T, 16 R; 343/100 SA, 113 R

[56] References Cited

U.S. PATENT DOCUMENTS

| | | | |
|---|---|---|---|
| 3,356,989 | 12/1967 | Autrey | 340/6 R |
| 3,594,718 | 7/1971 | Black | 340/6 R |
| 3,873,958 | 3/1975 | Whitehouse | 340/6 R |
| 4,060,792 | 11/1977 | van Heyningen | 340/6 R |

OTHER PUBLICATIONS

M. A. Jack et al., *Electronics Letters*, vol. 13, No. 3, pp. 65-66, Feb. 1977.
V. C. Anderson, *J. of the Acous. Soc. of Amer.*, Jul. 1960, pp. 867-870.

*Primary Examiner*—Richard A. Farley
*Attorney, Agent, or Firm*—David M. Warren; Joseph D. Pannone; Milton D. Bartlett

[57] ABSTRACT

A beamformer forms a beam from a set of samples of signals from an array of elements such as sonar transducers. Sequences of signal samples from each transducer are delayed relative to each other by fractional amounts of the intersample interval. The sequences of the signal samples with the predetermined delays therebetween are applied to a common beamforming filter having a pass band of sufficient width to accommodate the signals. The impulse response time of the filter is longer than the intersample interval in any one of the sample sequences for providing a beam equal to the sum of regenerated transducer signals. The radiation pattern of the beam is independent of the sampling rate.

11 Claims, 10 Drawing Figures

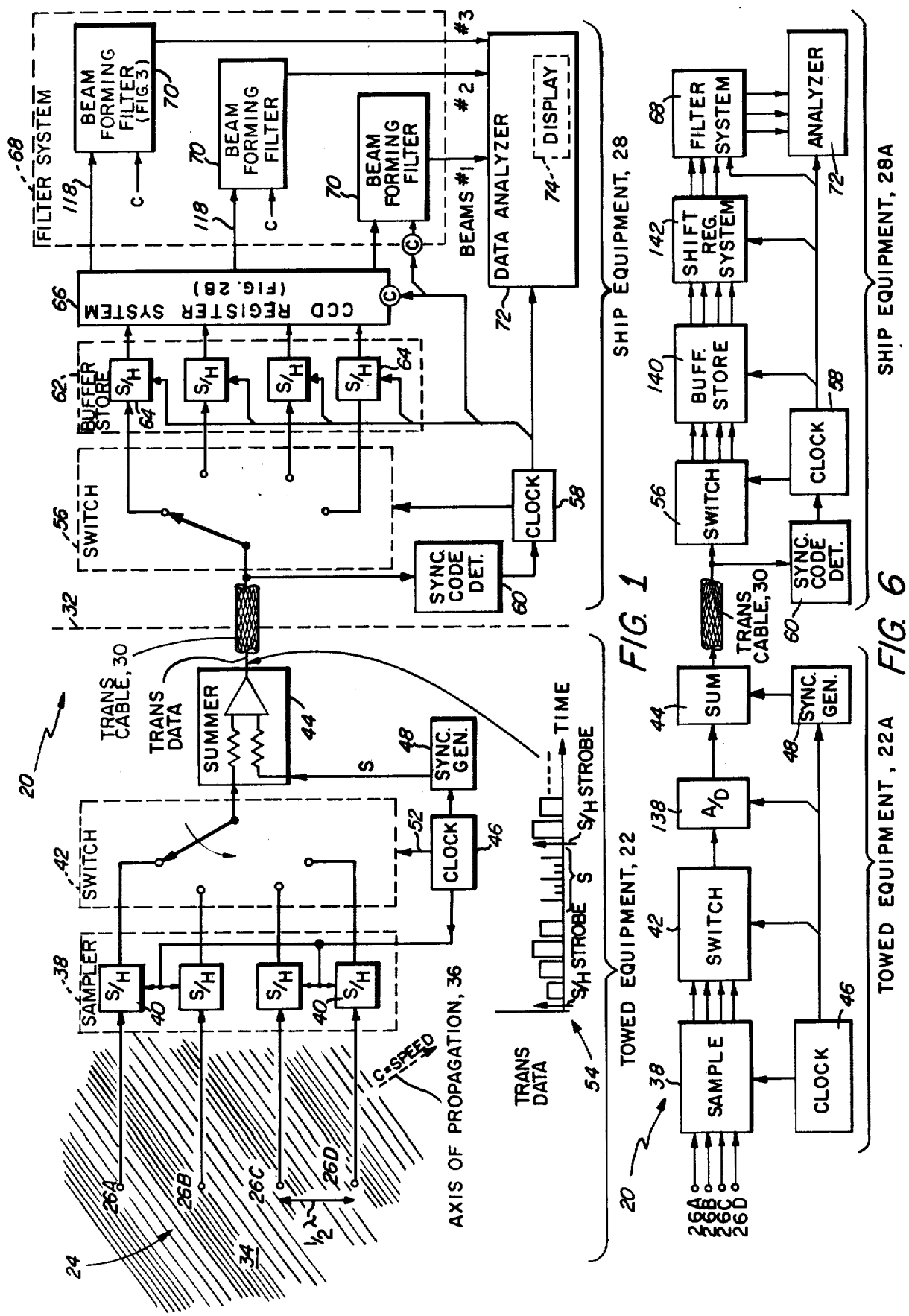

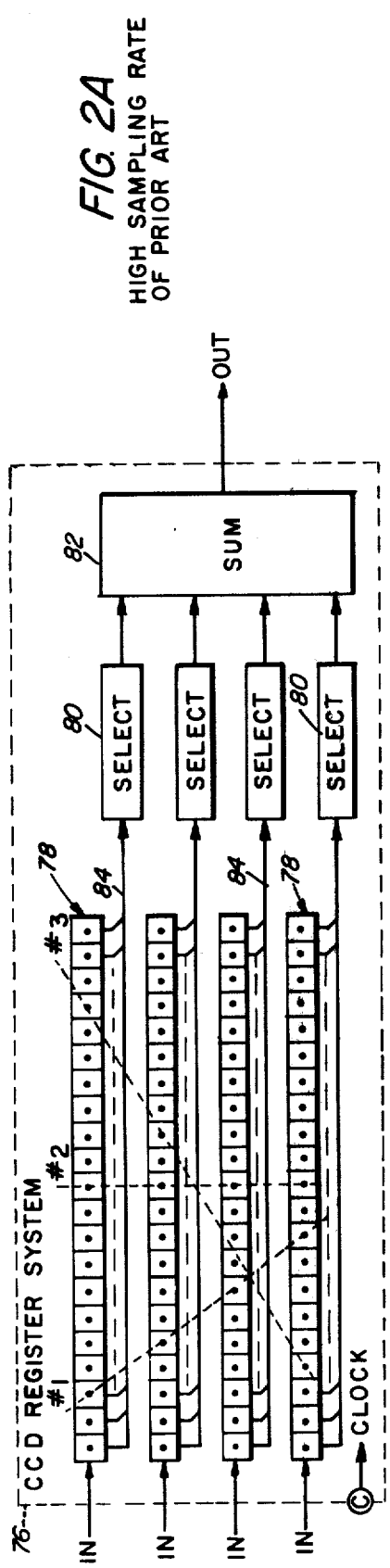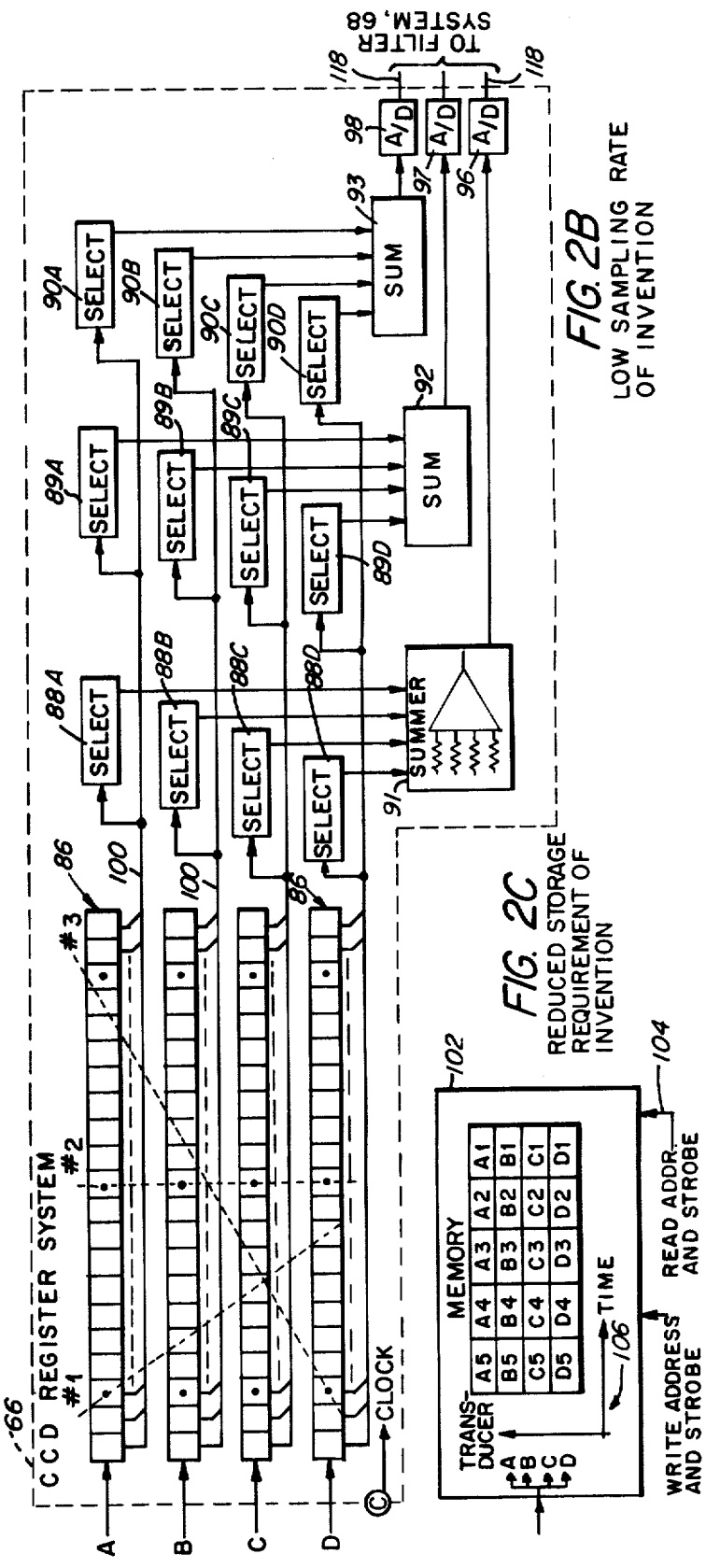

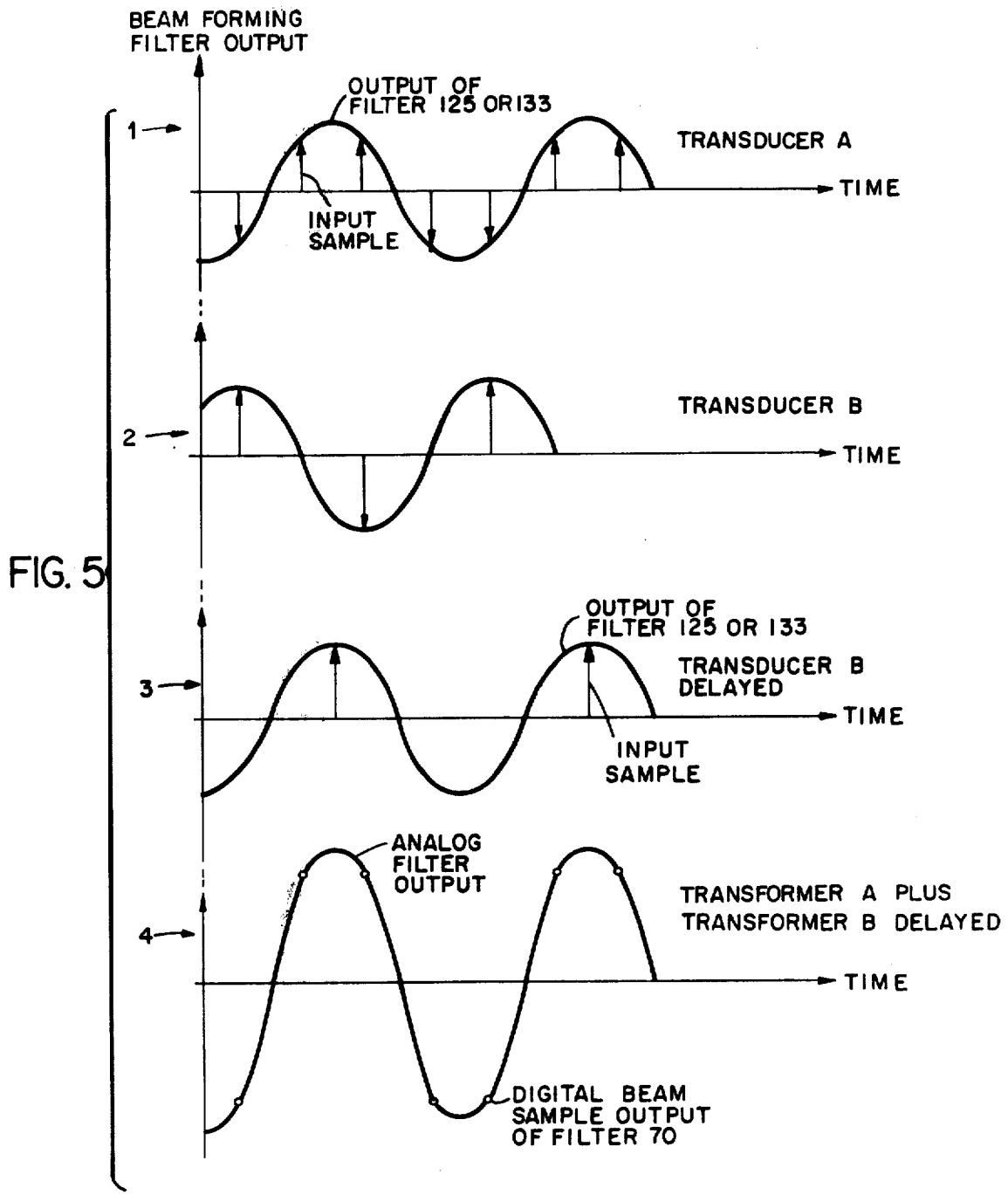

BEAMFORMER

BACKGROUND OF THE INVENTION

Beamformers are utilized with arrays of electromagnetic radiating elements and of sonic radiating elements, the latter referred to as transducers, for combining signals of the radiating elements to produce beams of electromagnetic energy and beams of sonic energy. The term beam is used both for a beam of transmitted radiant energy as well as for radiant energy received from a particular direction since the transmitting and receiving radiation patterns of an array of radiating elements are identical. Beamformers employ linear circuits for summing together the signals of the respective radiating elements and for imparting selective delays, or sometimes only phase shifts, to signals of the respective radiating elements. The selection of specific values of time delay is based on the direction of the desired beam relative to the array.

In some situations, the signals of the radiating elements are sampled repetitively to produce sequences of signal samples from each of the radiating elements. The sequences of samples are then transmitted to the beamformer which forms one or more beams as is desired. One important example is the case of a sonar array which is towed by a ship, in which case the beamformer is located on board the ship and separated from the array by a long cable which carries signals between the sonar transducers of the array and the beamformer. Typically, the signals of the transducers are sampled and are then multiplexed to permit their coupling via a single communication channel to the beamformer.

A problem arises in that the accuracy of the beam pattern depends on the sample rate, except in a special circumstance such as the broadside beam of a line array for a plane wave wherein the arrangement of the radiating elements within the array permits the occurrences of the signal samples of the respective radiating elements to be synchronized with a wavefront of the radiation. As is seen in an article entitled "Digital Array Phasing" by Victor C. Anderson which appears in the Journal of the Acoustical Society of America on Pages 867-870 in July 1960, beams can be constructed in a limited number of directions for which the samples selected from a history of the samples from the respective transducers lie on a wavefront of a wave in the respective directions. Such beams may be referred to as synchronous beams since the requisite delays of the respective samples are in synchronism with the times of arrival of the wavefront at the respective transducers. For all other beam directions, a compromise must be made to select a beam sample which has occurred either prior to or subsequent to the desired instant of time. As a result of this compromise, the radiation pattern of the beam is also compromised with the resultant degradation in the quality of the radiation pattern depending on the sample rates. Thus, a higher sample rate produces a smaller quantization error in the time delay of the samples selected for producing the beam.

The need for higher sample rates produces other problems. The cable which serves as the communication channel between the transducers of a towed array and the beamformer is of limited bandwidth, this limiting the rate at which signal samples can be transmitted. In systems employing the conversion of analog-to-digital signals, it has been the practice to time share a single analog-to-digital converter among several transducers with a selector switch being utilized for selectively coupling the signals of the respective transducers to the analog-to-digital converter. However, due to a limitation in the speed at which such converters can operate, the higher sampling rate decreases the number of transducers which may be sharing a single one of the converters so that a greater number of such converters is required. The problem is further compounded in large arrays having many radiating elements for producing a larger number of highly directive beams of radiation as is done with systems measuring angles to a high accuracy and a high resolution. The need for higher sampling rates also increases system complexity by requiring a higher storage capacity to the memory which stores the signal samples. The foregoing problems may also exist in the case of an electromagnetic array wherein a limited bandwidth communication channel is provided between the array and a beamformer. The ensuing description of the invention will be directed to a sonar situation for convenience in explaining the invention, it being understood that the use of the term transducer applies equally well to the radiating elements of the electromagnetic situation.

SUMMARY OF THE INVENTION

The aforementioned problems are overcome and other advantages are provided by a beamformer which, in accordance with the invention utilizes a beamforming filter, rather than one or more summing circuits of the prior art, for combining the samples of a signal appearing sequentially at the transducers of an array of transducers to produce a sonar beam. Sequences of signal samples from each transducer are delayed relative to each other in accordance with the direction of the beam relative to the array. The sequences of the signal samples from the respective transducers are applied with their respective delays to a common beamforming filter having a pass band of sufficient width to accommodate data of the signals, the impulse response time of the filter being longer than the intersample interval of the signal sampling process. Thereby, the beamforming filter provides a beam equal to the sum of the regenerated transducer signals. The beamforming filter utilized in a preferred embodiment of the invention is a digital filter having a finite impulse response, the frequency characteristic thereof being a low pass filter with a substantially flat attenuation characteristic in the pass band followed by a sharp cut-off precludes the appearance of harmonics of the sampling frequency appearing in the output beam signal.

An important feature of the invention may be seen by comparing the invention with the beamforming technique described in the aforementioned Anderson article. Therein, individual samples must be summed with other samples irrespectively as to whether or not such other samples have occurred in time synchronism with the occurrence of the wavefront. With the exception of a special situation such as the aforementioned broadside beam of a line array, the instant invention avoids the summation of samples as is taught by the aforementioned Anderson article, and provides for the coupling of samples delayed by fractional amounts of the intersample interval to the beamforming filter. Since the beamforming filter regenerates the signal from any one transducer of the array of transducers, and since the superposition principle applies due to the linearity of the filter, the filter provides the regeneration of a sum of the signals of the transducers of the array. Thereby, the beamforming filter is essentially functioning without regard to the specific instances of time when the various signal samples of the respective transducers arrive at the input terminal of the beamforming filter. Thus, the sequences of samples from the respective transducers may be delayed by an amount of time which is completely independent of the intersample interval. As a result, the sampling rate may be chosen as a matter of convenience rather then requiring the excessively high rates necessitated by the prior art beamforming systems. Accordingly, the sampling rate is dictated by the criterion utilized in telephony wherein the sampling rate is selected in accordance with the bandwidth of the data to be communicated, this being in accordance with the Nyquist sampling rate wherein the sampling rate must be at least twice the bandwidth of the data to be transmitted. As a practical matter in the design of such systems, a sampling rate somewhat higher than twice the bandwidth of the data, for example three times the bandwidth of the data, is utilized. This is a significant reduction from the sampling rate of the prior art which may be thirty times the bandwidth of the data.

The delaying of the sample sequences of the respective transducers may be accomplished by a set of shift registers or, preferably, a random access memory which is addressed at the precise instant of time for reading out data to give the desired time delay. The use of tapped shift registers with selection circuitry for selecting the requisite tap will be shown in one embodiment of the invention in order to teach the distinction between the invention and the system of the aforementioned Anderson article. Because of the lengthy shift registers required to produce many small increments of delay, the random access memory provides a much more efficient storage medium in terms of reduced complexity of equipment. The preferred embodiment of the invention utilizes the random access memory and a set of beamforming filters wherein one filter is utilized for each direction of the beams which are being simultaneously produced. The selection circuitry which selects the specific sample from the history of samples stored in the memory includes a summing circuit for the special circumstance wherein two signal samples of two separate transducers are to occur simultaneously, the summing circuit applying the sum of the two samples to the beamforming filter while coupling samples one at a time from the other transducers to the beamforming filter.

BRIEF DESCRIPTION OF THE DRAWINGS

The aforementioned aspects and other features are explained in the following description taken in connection with the accompanying drawings wherein:

FIG. 1 is a diagrammatic view of a towed array and beamformer incorporating the invention;

FIGS. 2A, 2B and 2C show storage media utilized for storing a history of the transducer signal samples and for providing the delays of the signal samples for forming the beam of FIG. 1, FIG. 2A showing the storage of a large number of samples as taught by the Anderson article while FIGS. 2B and 2C show the minimal storage requirements of the invention;

FIG. 5 is a set of graphs for use with the filters of FIGS. 3 and 4 for demonstrating the regeneration and combination of signals of the transducers of FIG. 1 to produce a beam;

FIG. 6 is a diagram of a system, similar to that of FIG. 1, but employing analog-to-digital conversion in a communication link and digital shift registers in lieu of CCD (charge coupled device) registers utilized for the analog samples of FIG. 1;

DESCRIPTION OF THE PREFERRED EMBODIMENTS

Figure 3:
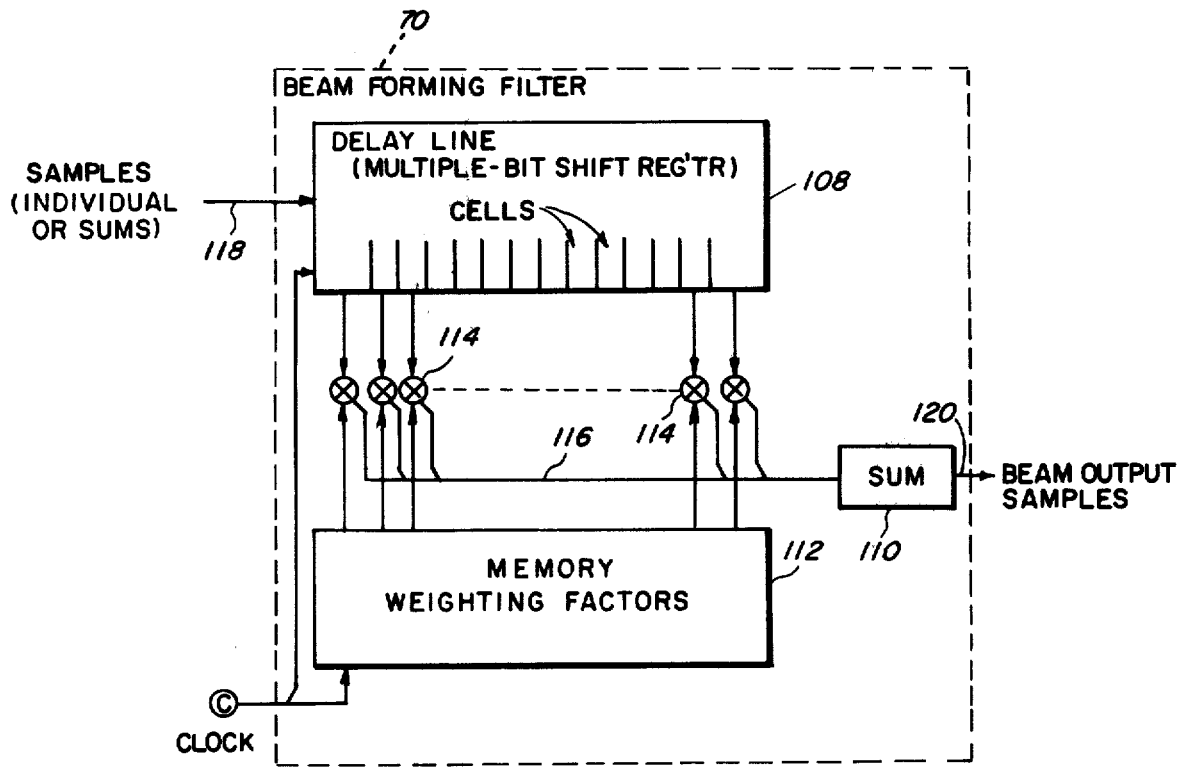
FIG. 3 is a block diagram of a beamforming filter of FIG. 1.

Referring now to FIG. 1, there is seen a sonar system 20 which comprises towed equipment 22 including an array 24 of transducers 26 with individual ones of the transducers 26 being further identified by the legends A-D when it is desired to specifically refer to one of the transducers 26. The system 20 further comprises equipment 28 carried on board a ship (not seen in the figures), the array 24 being towed behind the ship by a cable 30 which also serves as a transmission line for electrically coupling the array 24 to the equipment 28 on board the ship. A dashed line 32 passing through the cable 30 separates the towed equipment 22 on the left side of the Figure from the ship's equipment 28 on the right side of the Figure.

By way of example, the array 24 is shown as a line array with the transducers 26 arranged in a straight line. However, it is understood that other array configurations such as a circle or a three dimensional array such as a sphere may be utilized. A sound wave 34 is shown propagating through the water of the ocean in which the array 24 is immersed, the wave 34 propagating past the transducers 26 in the direction of an axis 36.

The towed equipment 22 further includes a sampler 38 comprising a set of sample-and-hold units 40, a selector switch 42, a summer 44 including a power amplifier for driving the cable 30, a clock 46 and a generator 48 for generating a sync signal for synchronizing the operation of the towed equipment 22 with the ship's equipment 28. The transducers 26 are coupled respectively to input terminals of the switch 42 by individual ones of the sample-and-hold units 40. Electrical signals produced by the transducers 26 in response to the sound wave 34 incident thereupon are sampled by the sample-and-hold units 40 in response to a strobing signal applied by the clock 46 to the sample-and-hold units 40 via line 50.

The signal samples held by the sample-and-hold units 40 are sequentially selected by the switch 42, the switch 42 being driven by a signal on line 52 provided by the clock 46. The clock 46 also applies clock pulses to the generator 48 for activating the generator 48 to produce the sync signal which is then coupled to an input terminal of the summer 44. The signal samples selected by the switch 42 are also coupled to an input terminal of the summer 44, the summer 44 being shown by way of example as an operational amplifier having summing resistors coupled respectively to the switch 42 and the generator 48.

As seen in a graph 54, adjacent the clock 46, the clock 46 first provides the strobe signal on line 50 to the sample-and hold units 40, this being followed by the driving of the switch 42 for coupling the summer 44 to individual ones of the signal samples respectively of the transducers 26A-D. At the conclusion of the operation of the switch 42, the clock 46 then activates the generator 48 to provide the aforementioned sync signal which is shown, by way of example in the graph 54, as a sequence of binary digital signals forming a code word. Thereafter, the foregoing procedure is repeated with the sample-and-hold units 40 being again strobed to provide new samples of the transducer signals. Thereby, sequences of signals samples of the respective transducers 26A-D are coupled via the summer 44 to the cable 30, with a synchronization code word, identified by the letter S in the figure, of the generator 48 being inserted between successive ones of the sequences.

The ship's equipment 28 comprises a switch 56 which is similar to the switch 42, a clock 58, a sync code detector 60 for detecting the code of the generator 48, a buffer storage unit 62 which includes a set of sample-and-hold units 64 which are similar to the sample-and-hold units 40, a register system 66 of charge coupled devices (CCD), a filter system 68 which includes a set of beamforming filters 70, and a utilization device which, by way of example, is shown as a data analyzer 72 having a display 74. The switch 56 is driven by the clock 58 in a manner analogous to the driving of the switch 42 by the clock 46, the clock 58 being synchronized with the clock 46, and the switch 56 being synchronized with the switch 42 by a pulse applied to the clock 58 by the detector 60. The clock 58 also strobes the sample-and-hold units 64 sequentially in accordance with the sequential positions of the switch 56 for storing individual ones of the signal samples coupled via the cable 30 from corresponding ones of the transducers 26A-D. In addition, the clock 58 applies timing signals to the register system 66, the filter system 68 and the analyzer 72 for synchronizing their operation with the operation of the switch 56.

The sound wave 34 is depicted as a set of planar wavefronts which are drawn close together to indicate regions of compression and drawn further apart to indicate regions of rarefaction. The transducers 26 are spaced apart by less than approximately one-half wavelength of the wave 34 to permit the generation of a well-defined beam pattern having essentially no grating lobes and grating nulls. With respect to the foregoing example of four transducers 26, the propagation time of the wave 34 in crossing the array 25 in an end-fire direction is equal to approximately the duration of two periods of the wave 34. For propagation in the broadside direction, a wavefront is incident upon all four of the transducers 26 simultaneously. Accordingly, in the formation of a beam by the array 24, sufficient storage space for the storing of samples of the transducer signals need be provided to store a history of the signal samples over the interval of time equal to two periods of the wave 34. In the event that an array longer than the array 24 is utilized, additional storage need be utilized commensurate with the maximum propagation time by the wave 34 across the longer array. As will be seen subsequently, the register system 66 is utilized for the storage of a history of the signal samples of each of the transducers 26A-D. Due to the synchronized operation of the switches 42 and 56, the set of samples stored in the buffer storage unit 62 at the conclusion of the transmission of a sequence of the samples is identical to the set of samples held in the sampler 38 upon the occurrence of the strobing signal on line 50. Accordingly, with reference to the formation of a beam for the array 24, the transducer signal samples of the buffer storage unit 62 may be utilized as the input data for the beamforming operation.

As will be described subsequently, a beamforming filter 70 is utilized for the formation of a beam in a single direction. For forming a beam in a second direction, a second beamforming filter is utilized. By way of example, FIG. 1 shows three filters 70 for forming three beams in three different directions simultaneously. Each of the filters 70 utilizes data drawn from the history of samples stored in the register system 66 in the formation of a beam. Signal samples of the respective beams are coupled from the respective filters 70 to the analyzer 72 which, by way of example, may perform a Fourier transformation to aid in signature identification of an echo signal carried by the wave 34 with the direction of an identified echo being indicated on the display 74.

Referring now to FIGS. 2A-2C, there is shown the storage of transducer signal samples and the utilization of the stored samples for the forming of a beam. FIG. 2A shows the storage of transducer signal samples in accordance with the teachings of the aforementioned Anderson article. While Anderson teaches the use of a set of digital shift registers, FIG. 2A shows, by way of example, a set of CCD registers for storing analog samples in a manner analogous to the storage of the digital samples of Anderson. A distinctive feature of FIG. 2A is the utilization of each cell of the register for the storage of transducer signal samples.

In accordance with the invention, FIG. 2B teaches the use of a set of CCD registers for one embodiment of the invention wherein most of the storage cells of the registers are empty, only a small fraction of the cells being utilized at any one time for the storage of transducer signal samples. FIG. 2C shows a storage media in accordance with a preferred embodiment of the invention, the storage media being in the form of a random access memory which greatly reduces the amount of equipment required for the storage of the transducer signal samples as compared to the lengthy registers of FIG. 2B. The embodiment of FIG. 2B is presented for illustrating the difference between the utilization of storage in the Anderson system and the utilization of storage by the present invention.

FIG. 2A shows a system 76 of CCD registers 78 wherein samples of analog data are clocked along each of the registers 78 from cell to cell by clock pulse signals at terminal C. The system 76 further comprising selector switches 80 and a summer 82 for summing together signal samples from respective ones of the registers 78 coupled to the summer by respective ones of the switches 80. Each cell of a register 78 has an output terminal, the output terminals of the respective cells being individually coupled by lines seen fanning into a line 84 for connecting the output terminals of each of the cells of the register 78 to its corresponding selector switch 80. Signal samples from respective ones of the transducers of the array 24 of transducers are coupled to the input terminals of the respective registers 78, with samples of the beam produced by the summing of the samples at the summer 82 appearing at the output terminal of the summer 82.

Diagonal lines labeled #1, #2 and #3 are shown superposed upon the set of registers 78. Each of these lines represents diagrammatically the direction of incidence of a wavefront upon a line array of radiating elements or transducers with the line #2 representing a wave incident in the broadside direction upon the array. The points of intersection of the lines #1, #2 and #3 with the registers 78 are representative of the amounts of delay which are to be imparted to the signal samples by the registers 78 to compensate for the differences in propagation times wherein a wavefront is incident sequentially on each of the transducers of the array. Thus, with reference to line #1, the line is seen to intercept the second of the registers 78 at a point more distant from the input terminal thereof than is the case with the first of the registers 78 and, similarly, the points of intersection of the line with the third and fourth of the registers 78 is seen to be still further removed from the input terminals of those registers. Since a line array has been presumed, the lines #1, #2 and #3 are drawn as straight lines with the result that, with respect to line #1, the amounts of delay imparted by the second, third and fourth of the registers 78 increase linearly over the amount of delay imparted by the first of the registers 78. The wave represented by line #3 is first incident upon a transducer at the opposite end of the array from that upon which the wave of line #1 is first incident. Accordingly, the delays represented by the points of intersections of line #3 with the respective ones of the registers 78 are seen to increase linearly with the third, the second and the first of the registers 78 from the amount of delay imparted by the fourth of the registers 78.

The registers 78 are portrayed in FIG. 2A as having a large number of cells so that the storage medium represented by a set of registers 78 presents the overall visual appearance of densely packed cells. Due to the dense packing of the cells, it is possible to construct diagonal lines, such as the lines #1, #2 and #3, which intersect, essentially, the center of a cell in each of the respective registers 78. Wavefronts incident at the directions represented by the aforementioned lines permit the production of beam output samples for the summer 82 which are essentially free of quantization errors associated with the sampling of signals. In these cases, the wavefronts represented by the foregoing diagonal lines appear to be in synchronism with the times of occurrence of the samples stored in the cells of the registers 78. Diagonal lines can be drawn in many more directions for which the aforementioned synchronous relationship does not apply and, in which cases, a diagonal line may intercept the centers of one or two of the cells of the set of registers 78 but not the centers of all of the cells along the diagonal line. In these latter cases, a compromise is made in the selection of the cells from which signal samples are to be extracted by the selector switches 80 to produce a sample of the beam at the output of the summer 82. Either a sample immediately preceding the point of intersection of the diagonal line with a register 78, or a sample immediately after that point of intersection is to be selected but with a resultant quantization error resulting from an insufficiency of stored signal samples to insure that there would be a stored sample at that point of intersection. As a result, it is seen that the greater the density of the cells for storing the samples in the set of registers 78, the greater the number of beams which can be accurately formed. Also, it is noted that with a highly dense array of the cells, the magnitudes of the quantization errors are reduced also for those situations wherein the aforementioned compromise need be made. Accordingly, it is seen that for the generation of a digitally stepped azmuthally scanned beam, utilizing the register system 76, the radiation pattern of the beam varies with direction of the beam, the radiation pattern being most accurately formed with those directions wherein the wavefront is in synchronism with the sample delays produced by the respective cells within the registers 78, the radiation pattern being less accurately formed in those directions wherein the aforementioned compromise is made with the attendant quantization errors.

In accordance with the invention, the register system 66 of FIG. 2B, also seen in FIG. 1, is depicted with a minimal density of stored samples of the transducer signals, with the great majority of the storage cells of the register system 66 being empty. As will be explained subsequently, the register system 66 in combination with a beamforming filter 70 of FIG. 1 can produce beam output samples for any one beam in a desired direction relative to an array of transducers in a manner which is independent of the sampling rate of the transducer signals. There is a requirement that the sampling rate be sufficiently high to regenerate data within the bandwidth of interest in accordance with the well-known sampling theorem at a rate at least twice the bandwidth of the data in the signal. However, it should be noted that this restriction on the minimal rate of sampling has nothing to do with the beamforming operation but, rather, is concerned simply with the regeneration of a signal from a set of samples thereof. Insofar as the beamforming process of this invention is concerned, there is no restriction on the rate of sampling; any convenient sampling rate may be utilized as long as that rate is consistent with the sampling theorem for regeneration of the signal data.

The register system 66 of FIG. 2B comprises a set of registers 86 similar to the CCD registers 78 of FIG. 2A, selector switches 88 with individual ones thereof being further identified by the legends A–D when it is desired to refer to specific ones of the switches 88, selector switches 89 which are further identified by the legends A–D when it is desired to refer to a specific one of the switches 89, selector switches 90 which are also further identified by the legends A–D, summers 91, 92 and 93, and analog-to-digital converters 96, 97 and 98. The cells of the registers 86 are coupled to the switches 88 in the same manner as was described previously with respect to the coupling of the registers 78 to the switches 80. The switches 88 are coupled to the summer 91 in the same manner as was previously described with reference to the coupling of the switches 80 to the summer 82. The switches 88 and the summer 91 in cooperation with a beamforming filter 70 of FIG. 1 provides output samples for beam #1. The switches 89 and the switches 90 are similarly coupled to the respective ones of the registers 86 as are the switches 88. The switches 89 and the switches 90 are respectively coupled to the summers 92 and 93 in the same manner as has been described for the coupling of the switches 88 to the summer 91. Analog output signal samples of the summers 91-93 are converted from analog-to-digital signals respectively by the converters 96-98. The converted signals produced by the converters 96-98 are coupled to respective ones of the beamforming filters 70 of the filter system 68 for the production of the exemplary set of three beams #1, #2 and #3.

Even though a relatively small fraction of the cells of the registers 86 contain stored transducer signal samples due to the relatively low sampling rate, output terminals of each of the cells are coupled to the switches 88–90 by lines seen fanning into lines 100. The cells of the first register 86, identified by the input terminal A for designating signals emanating from the transducer 26A of FIG. 1, are each coupled to the switch 88A, the switch 89A and the switch 90A. The input terminals of the second, third and fourth of the registers 86 are similarly identified by the letters B, C and D for identifying respectively signals emanating from the transducers 26B–D. Each of the cells of the second, third and fourth of the registers 86 are similarly coupled via lines 100 respectively to the switches 88B–D, 89B–D, and 90B–D. Samples entering each of the registers 86 at the left-hand end thereof are clocked toward the right through the registers 86 in response to clock signals coupled via terminal C from the clock 58 of FIG. 1. While only three summers 91–93 are shown in FIG. 2B to be utilized in conjunction with three beamforming filters 70 for the forming of three beams in three separate directions, it is understood that additional summers and beamforming filters and additional sets of selector switches would be utilized for the simultaneous formation of additional beams in additional directions.

Upon inspection of FIGS. 2A and 2B it becomes apparent that a distinguishing feature of the storage media provided by the registers 86 of FIG. 2B is the fact that diagonal lines generally intersect, at most, only one stored signal sample at a time. There are exceptions such as the foregoing synchronous beams represented by the lines #1, #2 and #3. Another exception occurs in the case of beam directions near the end-fire direction wherein the delays in propagation time from one transducer to the next transducer, or between a transducer at one end of an array and a transducer many wavelengths apart along the array, are commensurate with the intersample interval utilized in sampling the transducer signals. As a result, a fundamental distinction becomes evident between the inventive use of storage of FIG. 2B as compared to the prior art use of storage of FIG. 2A, this distinction being that the summers 91–93 do not normally sum together two or more signal samples as does the summer 82 but, rather, simply serve as a fanning-in network by which signal samples from the switches 88–90 are fed, one at a time, to the respective beamforming filters 70 of the filter system 68, and wherein the delays between the successive entries of samples to any one of the beamforming filters 70 are dependent on the direction of a beam to be formed. In particular, it is noted that, in contrast to the beam output samples produced by the summer 82 of FIG. 2A, the summers 91–93 of FIG. 2B produce no beam output samples except in the special case of the broadside direction and also with the possible exception of a near end-fire direction wherein the propagation time of a wavefront from one transducer to the next transducer in the array is, by chance, equal to the intersample interval. The summer 91 is portrayed as an operational amplifier having a set of summing resistors coupled to the respective ones of the switches 88 whereby the selected samples may be fanned in, analogously to a logic OR circuit, or may be summed together in the event that two or more of the samples happen to be applied to the summer 91 at the same instant of time. Similar comments apply to the summers 92 and 93.

While the register system 66 of FIG. 2B has been disclosed for one embodiment of the invention because of its utility in teaching the distinction between this invention and a prior art system, the preferred embodiment of the invention utilizes the memory system of FIG. 2C, as was noted hereinabove, because of the great reduction in the amount of equipment to be utilized for storage of the transducer signal samples. FIG. 2C shows a memory 102, such as a random access memory, which will be utilized in a manner to be described hereinafter with reference to FIG. 7. By way of comparison of the storage media of the memory 102 and of the registers 86, it is noted that the registers 86 are provided with numerous cells in conjunction with a high clock rate at terminal C for reduction of the quantization errors. In this respect, it is noted that much more storage space is provided by the register 86 then is actually utilized because of the numerous empty cells. Accordingly, the memory 102 is provided with sufficient storage capacity to store the number of signal samples actually present in the set of registers 86 at any one instant of time. The requisite delays in the reading out of samples from storage is accomplished by a read signal on line 104, comprising an address signal and a strobe signal, which is timed by the system of FIG. 7 to occur at the instants of time corresponding to the desired delays.

The memory 102 is portrayed as having four rows including the legends A, B, C and D, which correspond to the four transducers 26A–D of FIG. 1. The memory 102 is further portrayed as having five columns dividing each of the rows into cells such as the cells A1–A5, with each cell storing one signal sample. By way of example, at the beginning of a beamforming operation the memory 102 is empty. Thereafter, successive signal samples of the transducer 26A are stored in the cells of the top row of the memory 102, the cell A1 representing the first or oldest sample to be stored, the cell A2 representing the second or next oldest sample to be stored and similarly, with the cells A3, A4 and A5. In the same fashion, the signal samples of the transducers 26B–D are stored in the second, third and fourth rows of the memory 102. A graph 106, having a horizontal axis representing time and a vertical axis representing the locations of the transducers of the array 24 of FIG. 1, is presented adjacent the matrix of the rows and columns. The graph 106 demonstrates that the successive cells in a row, such as the successive cells D1–D5, in addition to identifying the locations of signal samples stored in the memory 102, also serve to identify the time elapsed from the initiation of the storing of samples in the memory 102 until the memory 102 becomes filled with samples. The memory 102 is able to provide sufficient delay, as does a register 86 of FIG. 2B, to equal or exceed the time required for a wavefront to propagate past an array such as the array 24 of FIG. 1. Since the greatest propagation time occurs in the end-fire direction, the number of columns of the memory 102 must be sufficient to store the number of samples occurring during the time required for a wavefront of the radiation to propagate across the array in an end-fire direction. While five columns are shown in FIG. 2C, it is understood that any more columns may be required for a long array.

By way of example, with reference to FIGS. 2C and 1, it is assumed that the transducers 26A–D are approximately one-half wavelength apart, and that samples are to be taken at a sufficient rate to cover a signal bandwidth from zero frequency up to the frequency of the wave 34. At least four samples are taken during the time that a wavefront propagates past the array 24 to satisfy the sampling theorem. The five columns of the memory have been provided to permit the use of a slightly higher rate than the minimum sampling rate, or Nyquist rate. As will be explained subsequently with reference to FIG. 7, after the columns of the memory have been filled, the first column to have been filled is cleared and new samples are stored therein, subsequent columns being cleared thereafter with new samples being stored therein.

Referring now to FIG. 3, there is seen a block diagram fo a digital implementation of the beamforming filter 70 of FIG. 1, the filter 70 having a finite impulse response and a frequency and phase characteristic which approximates an ideal low pass filter having a sharp cut-off frequency. The filter 70 is constructed in the form of a transversal filter having a tapped delay line 108, a summer 110, a memory 112 storing weighting factors, and a set of multipliers 114 coupled respectively between each of the taps of the delay line 108 and the memory 112 with the output terminals of the multipliers 114 being coupled via lines seen fanning into a line 116 for coupling the output terminals of the multipliers 114 to the summer 110. Signal samples from the register system 66 of FIGS. 1 and 2B are coupled via line 118 to the first cell of the delay line 108, a signal sample of the first cell being transferred toward the right sequentially through the other cells in response to clock pulses appearing at terminal C. The delay line 108 is constructed in the form of a multiple bit shift register wherein each cell of the shift register has a set of slots for storing the digits of the digital numbers of line 118 representing the amplitudes of the signal samples as provided by a converter such as the converter 96 of FIG. 2B. Each of the multipliers 114 is provided with a specific value of weighting factor by the memory 112 in accordance with the specific one of the cells of the delay line 108 to which the multiplier 114 is coupled. Each multiplier 114 multiplies the value of the signal in its respective cell by the respective weighting factor and passes the resulting product to the summer 110, the summer 110 forming the sum of all the products of the multipliers 114 to produce a resultant beam output sample on line 120. One beam output sample appears on line 120 with each clocking of the shift register of the delay line 108 by the clock pulse from terminal C.

With reference to both FIGS. 2B and 3 it is seen that the rate of clocking of a signal sample from one cell to the next in a register 86 is the same as the rate of clocking a sample from one cell to the next in the delay line 108. In view of the numerous empty cells present in each of the registers 86, it is apparent that values of zero appear on a line 118 interspersed among the non-zero values of transducer signal samples as the successive zero and non-zero values are clocked by clock pulses at terminal C from the register system 66 to a beamforming filter 70. The impulse response time of the filter 70, as has been noted hereinbefore, is longer than the intersample interval of signal samples from one of the transducers 26 of FIG. 1.

In the operation of a filter 70, by way of example, the time required for a signal sample to propagate from the first cell to the last cell of the delay line 108 may be equal to five times the aforementioned intersample interval. Assuming that the delay line 108 is constructed of thirty cells, the multipliers 114 and the memory 112 would be triggered by clock pulses at terminal C to perform their respective multiplications five times during the propagation of a signal sample from the first cell to the last cell of the delay line 108 to provide an output beam sample rate on line 120 which is equal to the sample rate of signal samples from any one of the transducers 26. Accordingly, a set of zero and non-zero values of digital signals are clocked in on line 118 until the first six cells of the thirty cells are filled, thereupon the multiplication of the multipliers 114 is performed, the multiplication operation being completed before the next clocking of the delay line 108. With the next clocking of the delay line 108, the stored data is advanced so that the seventh cell is filled, the clocking continuing until the first twelve cells are filled, whereupon the multipliers 114 and the memory 112 are again triggered by clock signals at terminal C to again perform a multiplying operation. The procedure continues such that with each advance of the data through another six cells of the delay line 108, a multiplying operation is performed. In this way, the aforementioned equality between the output sample rate of the beamforming filter 70 and the sampling rate of a transducer signal is maintained. The design of filters, such as the beamforming filters 70 having a finite impulse response characteristic, is described in two articles, the first article being entitled "A Digital Signal Processing Approach to Interpolation" by R. W. Schafer and L. R. Rabiner, appearing in the Proceedings of the IEEE of June 1973, Pages 692–702, and the second article being entitled "A Novel Implementation For Narrow-Band FIR Digital Filters" by L. R. Rabiner and R. E. Crochiere appearing in the IEEE Transaction on Acoustical Speech and Signal Processing of October 1975 at Pages 457–464.

Figure 4:
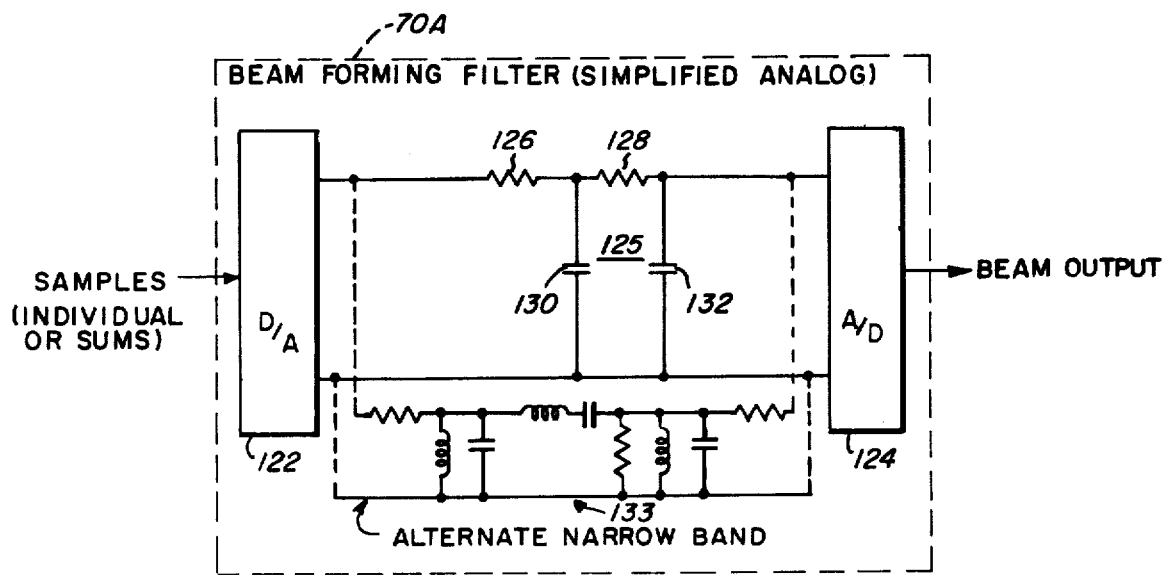
FIG. 4 shows an analog filter analogous to the digital beamforming filter of FIG. 3, the filter of FIG. 4 being useful in explaining the theory of the invention.

Referring now to FIG. 4, there is seen an alternative embodiment of the beamforming filter 70 of FIG. 3, this alternative embodiment being identified by the legend 70A and being presented to facilitate explanation of the beamforming function of the filter 70. The beamforming filter 70A is seen to comprise a digital-to-analog converter 122, an analog-to-digital converter 124, and a low pass filter 125 interconnecting the two converters 122 and 124, the low pass filter 125 comprising two resistors 126 and 128 and two capacitors 130 and 132. Alternatively, the two converters 122 and 124 may be coupled, as is noted by the dashed lines, by a band pass filter 133 shown by an exemplary pair of inductor-capacitor circuits coupled by an inductor-capacitor series circuit. The impulse response time of the filter 125 as well as the impulse response time of the filter 133 is longer than the intersample interval between successive signal samples of any one of the transducers 26 of FIG. 1 in order to provide for an integration of the individual samples to regenerate a signal from the samples thereof.

With reference also to FIG. 5, the operation of the beamforming filter 70A of FIG. 4 as well as the operation of the beamforming filter 70 of FIG. 3 will be explained. FIG. 5 shows four graphs drawn in temporal registration with each other, the graphs being identified by the numerals 1–4 at the left side of the graphs. The graphs depict signal samples for the transducers 26A and 26B of the array 24 of FIG. 1 for the direction of propagation of the wave 34 along the axis 36. In the first two graphs, vertical arrows depict signal samples respectively of the transducers 26A and 26B as they appear in the buffer storage unit 62. The sinusoidal lines of the first two graphs represent corresponding output signals which would be produced by a filter such as the filter 125 or 133 for the situation wherein only samples from a transducer 26A or 26B, respectively, are present. The third graph shows the situation wherein the signal samples of the transducer 26B are first delayed by the register system 66 and then applied to the filter 125 or 133.

For the direction of the propagation axis 36 of FIG. 1, the sound wave 34 of FIG. 1 experiences a delay of somewhat less than one-half period in propagating from the transducer 26A to the transducer 26B. Accordingly, the third graph shows the input samples to the filter 125 or 133 and the output waveform thereof being delayed by three-eighths of a period of the sound wave 34. Also, by way of example in drawing the graphs of FIG. 5, it has been presumed that the transducer signals resulting from the impinging sound wave 34 are sampled at a rate of four samples per period of the sound wave 34. The fourth graph of FIG. 5 depicts the situation wherein the input samples of the first graph and the input samples of the third graph are simultanesouly applied to the filter 125 or 133 of FIG. 4. Since the low pass filter 125 as well as the bandpass filter 133 are linear and the superposition principle applies, the output signal of the filter 125 or 133 is equal to the sum of the output signals of the first and third graphs. Should sequences of signal samples from all the transducers 26 of the array 24 be applied simultaneously to the beamforming filter 70A, in which case the individual samples would arrive sequentially, one by one because of delays equal to fractions of the intersample interval, then the output signal of the beamforming filter 70A would be the desired beam. The same argument applies to the beamforming filter 70 of FIG. 3 since it too is linear and the superposition principle applies. However, with respect to the filter 70, since that filter is a digital filter rather than an analog filter, digital samples of the beam, rather than an analog beam signal, are provided, the samples being indicated by little circles in the fourth graph.

The desired bandwidth of the beamforming filter 70 of FIG. 3 may be further described with reference to FIG. 4. The rate of sampling of the sound wave 34 of FIG. 1 in the foregoing examples has been assumed to be sufficiently high to regenerate a sinusoidal signal equal to the frequency of the sound wave. Furthermore, in the event that there are lower frequency components to the sound wave such as sea noise, the sampling rate is high enough to reproduce those signals also. In view of the low pass filter 125 of FIG. 4 which has a cut-off frequency slightly above the frequency of the sound wave 34, the sound wave as well as the sea noise within a bandwidth from zero frequency to the frequency of the sound wave 34 is regenerated from the samples. A lower sampling rate may be utilized when it is desired to regenerate only the data of the sound wave signal carried by a relatively small portion of the spectrum of the sound wave signal. Thus, by way of example, assuming that the sound wave 34 has a frequency of 10 kHz (kilohertz) and that lower frequency sea noise is of intereset, the low pass filter 125 would be utilized and would have a cut-off frequency of approximately 10 kHz and a pass band of 10 kHz. On the other hand, if the band of interest is only 500 Hz wide and centered at the 10 kHz frequency of the sound wave 34, then the sampling frequency can be reduced to approximately the range of 1,000 Hz to 1,500 Hz and the bandpass filter 133 having a pass band of 500 Hz would be utilized. The graphs of FIG. 5 demonstrating the regeneration of an individual transducer signal and of the combination of transducer signals for forming a beam applies also to the example of the 500 Hz data bandwidth with the filter 133.

FIG. 6 shows a system 20A which is similar to the system 20 of FIG. 1 but employs digital sampling of the transducer signals and digital shift registers rather than the analog signal samples and CCD registers of the system 20 of FIG. 1. The system 20 comprises the sampler 38, switch 42, clock 46, sync generator 48, summer 44, cable 30, sync code detector 60, clock 58, switch 56, filter system 68 and analyzer 72 previously seen in FIG. 1. In addition, the towed equipment of FIG. 6, identified by the legend 22A, comprises an analog-to-digital converter 138 coupled between the switch 42 and the summer 44. Also, the ship's equipment of FIG. 6, identified by the legend 28A, comprises a buffer storage 140 and a shift register system 142. The operation of the towed equipment 22A is essentially the same as that previously described with respect to the towed equipment 22 except for the conversion of the analog signal samples appearing at the output of the switch 42 to digital signals by the converter 138. The digital signals of the converter 138 are then applied in sequence as shown by the graph 54 of FIG. 1 to the cable 30, the sync code of the generator 48 being inserted between occurrences of the sequences of the transducer signal samples as is seen in the graph 54. The buffer storage 140 comprises a set of digital registers in lieu of the sample-and-hold units 64 of FIG. 1. The shift register system 142 has the same form as the register system 66 of FIGS. 1 and 2B except that shift registers are utilized in lieu of the CCD registers 86, digital multiplexing switches are utilized in lieu of the selector switches 88, 89 and 90, and digital adders are utilized in lieu of the summers 91, 92 and 93. The converters 96-98 are not utilized since the signals are already in digital format.

Figure 7:
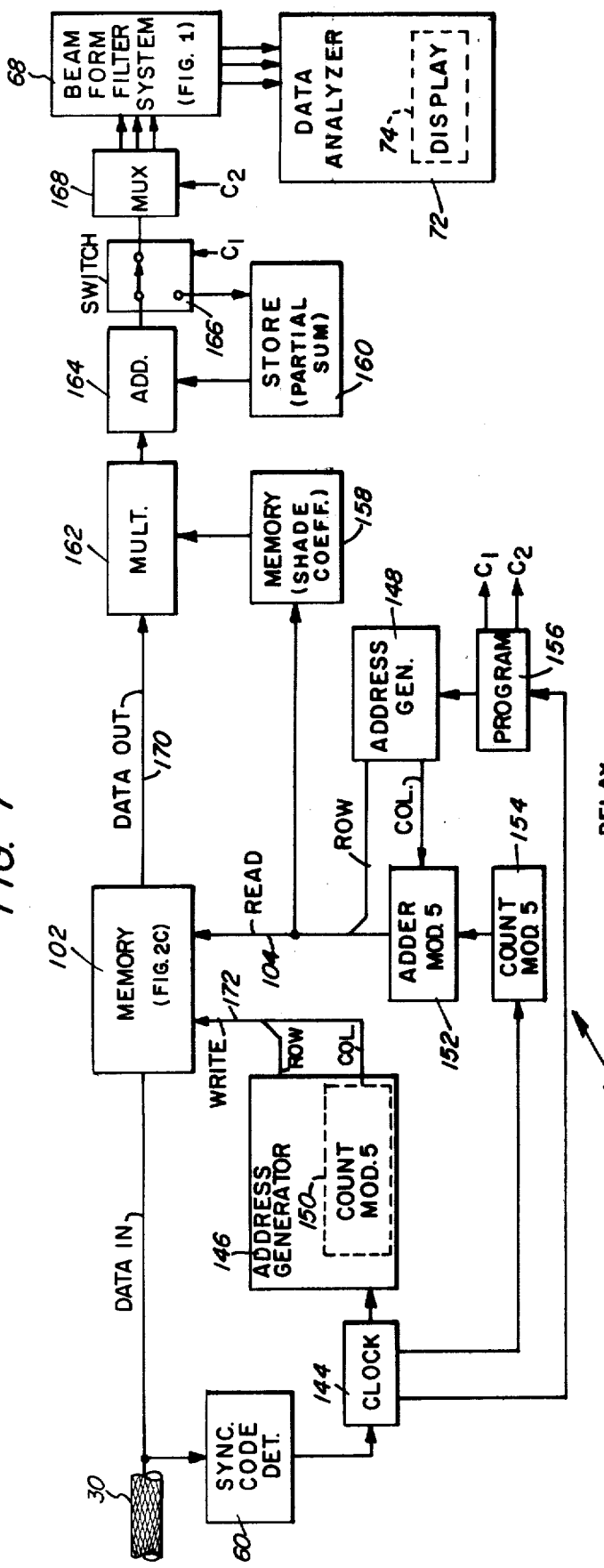
FIG. 7 is a block diagram of a preferred embodiment of the beamformer incorporating a random access memory for use with the system of FIG. 6.

Referring now to FIG. 7, there is seen an alternative embodiment of the ship's equipment 28A of FIG. 6, the embodiment of the ship's equipment of FIG. 7 being identified by the legend 28B. The equipment 28B is coupled to the cable 30 of FIGS. 1 and 6 and comprises the sync detector 60, the beamforming filter system 68 and the data analyzer 72 which was seen previously in FIGS. 1 and 6. In addition, the equipment 28B comprises a clock 144, address generators 146 and 148 with the generator 146 including a counter 150, an adder 152, a counter 154, a programmer 156, the memory 102 previously described in FIG. 2C, a memory 158, a storage unit 160, a multiplier 162, an adder 164, a switch 166 and a multiplexer 168. As has been described previously with reference to FIG. 2C, data of the memory 102 is read-out therefrom by a read signal provided on line 104. The data read-out of the memory 102 is coupled via line 170 to the multiplier 162. Data is read into the memory 102 in accordance with a write signal on line 172, the data being entered in the memory 102 from the cable 30 in response to the write signal. The write signal on line 172 is composed of a row address produced by the address generator 146 and a column address produced by the counter 150 in the generator 146. Similarly, the read signal on line 104 is composed of a row address signal produced by the generator 148 and a column address signal produced by the generator 148 in cooperation with the adder 152.

The clock 144 is synchronized to the clock 46 of FIG. 6 by the sync code detector 60 in a manner analogous to that previously described with reference to the clock 58 of FIGS. 1 and 6. The clock 144 produces timing signals which drive the generator 146, the counter 154 and the programmer 156. The programmer 156, in turn, drives the generator 148. By way of example in explaining the operation of the equipment 28B, the counter 154 is a modulo-5 counter in accordance with the five columns of the memory 102 shown in FIG. 2C and, similarly, the adder 152 is a modulo-5 adder in correspondence with the five columns of the memory 102 as shown in FIG. 2C. As was mentioned previously with reference to the description of FIG. 2C, the columns of the memory 102 are sequentially filled in with data in the form of signal samples from the transducers 26 of the array 24. After all the columns have been filled in, the oldest data is cleared out of its column so that that column is again available for new data. In this way, the addressing of the memory 102 may be viewed as following a rotating scheme in which the columns are filled sequentially from the first column to the fifth column, the sixth column of data being entered in the first column, the seventh column of data being entered into the second column and continuing with the scheme in which the column address is seen to advance in a modulo-5 fashion. The counter 150 of the generator 146, by counting modulo-5, provides the column address of the write signal on line 172, with the column address cycling through the numbers 1-5 by virtue of the modulo-5 counting. Upon entry of new data from the cable 30 by the generator 146 in the respective cells of the memory 102, the previous data stored in the respective cells is erased. Thereby new data is stored cyclically among the five columns. Individual ones of the four rows of the memory 102, corresponding to individual ones of the transducers 26A-D, are selected by the generator 146.

The generator 148 provides the aforementioned read signal for addressing the specific cell of the memory 102 as are designated by the programmer 156. In accordance with the cycling of the columns of the write address, the columns of the read address, as provided by the generator 148, are cycled by the adder 152 and the counter 154. For the reading out of data, the counter 154 is initially set at zero whereupon the adder 152 adds the value of zero to the column address produced by the generator 148 so that the column address of the read signal on line 104 is initially equal to the column address of the generator 146. The counter 154 counts from zero through four, the count of the counter 154 being added to the column address of the generator 148 by the adder 152 which adds modulo-5 to produce the cycling of the column address of the read signal.

Before combining the transducer signal samples in the beamforming filters of the filter system 68, it is frequently desirable to shade or weight the transducer signal samples to shape the radiation pattern of the array 24 of FIG. 1 to a prescribed form. In accordance with the read signal on line 104, the memory 158 provides a shading coefficient to the multiplier 162 corresponding to the signal sample read out of the memory 102. The multiplier 162 multiplies each signal sample of the memory 102 by the corresponding coefficient to produce products which are the shaded transducer signal samples.

As was described with reference to FIG. 2B, two transducer signal samples may be summed together in certain situations before being presented to the filter system 68. Such summation is accomplished by the adder 164. In view of the serial extraction of data from the memory 102, the first of two or more samples to be summed by the adder 164 is passed by the switch 166 to the storage unit 160 where it is held until the appearance of the next sample at the adder 164 at which time the two samples are added together. At the conclusion of the summing operation of the adder 164, the sum is passed via the multiplexer 168 to the requisite one of the beamforming filters of the system 68 which is forming the specific one of the beams. The switch 166 and the multiplexer 168 are operated by signals of the programmer 156 applied via terminals C1 and C2 respectively to the switch 166 and the multiplexer 168. The multiplexer 168, by coupling the appropriately delayed transducer signal samples to each of the beamforming filters of the system 68, provides for the generation of a plurality of beams simultaneously. The resulting beam samples are then coupled to the analyzer 72.

Figure 8:
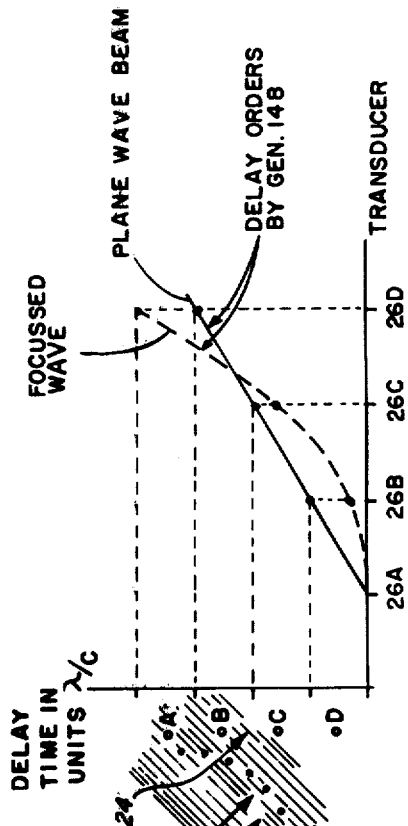
FIG. 8 is a graph of delay times implemented by a programmer of FIG. 7 for focussing at infinity and for focussing at a nearby focal point.

Referring also to the graph of FIG. 8, the operation of the programmer 156 is explained for the forming of a beam as well as for focussing the array 24 of FIG. 1 at a specific focal point. For convenience, the array 24 and the sound wave 34 have been redrawn at the left side of FIG. 8. As was described previously in FIG. 2B, the relationship between the transducer signal delay as a function of transducer postion in the array 24 is represented by a straight line for forming a beam of radiation. The straight line is reproduced in the graph of FIG. 8. The foregoing linear relationship represents the delays in propagation time of a planar wavefront incident sequentially upon the transducers of the array 24. For focussing at the focal point, the wavefront is regarded as being curved at constant radius about the focal point as is shown by the dotted line in FIG. 8. The corresponding relationship of delay versus transducer position in the array 24 is shown by a curved dashed line in the graph. The vertical axis of the graph shows the delay time in terms of units equal to the ratio of the wavelength to the propagation speed. The transducer position is shown on the horizontal axis of the graph. The programmer 156, in accordance with clock signals from the clock 144, activates the generator 148 at the requisite times for producing the delays prescribed by the graph of FIG. 8 for the case of an array focussed at infinity (the planar wavefront) or for the case of an array focussed at a nearby focal point (the curved wavefront).

It is understood that the above-described embodiments of the invention are illustrative only and that modifications therof may occur to those skilled in the art. Accordingly, it is desired that this invention is not to be limited to the embodiments disclosed herein, but is to be limited only as defined by the appended claims.

What is claimed is:

1. A beamformer for forming a beam from signals of an array of transducers, said beamformer comprising:
   means for sampling signals of individual ones of said transducers to provide samples of said signals;
   means for delaying said samples in increments of fractional amounts of the intersample interval between successive signal samples of any one of said transducers;
   a beamforming filter; and
   means connected between said delaying means and said filter for coupling individual ones of said samples, one at a time, from said delaying means to said filter, the impulse response time of said filter being longer than said intersample interval to provide an integration of signal samples of said transducers to produce said beam.

2. A beamformer according to claim 1 wherein said coupling means includes means for selecting individual ones of said samples having predetermined amounts of delay corresponding to the locations of respective transducers in said array for forming a beam in a predetermined direction.

3. A beamformer according to claim 1 wherein said delaying means includes a memory for storing said samples and means for addressing said memory, said addressing means addressing samples stored in said memory at predetermined instants of time corresponding to the relative locations of said transducers in said array.

4. A beamformer according to claim 3 wherein said coupling means comprises means for summing together the signal samples of transducers simultaneously illuminated by a common wavefront of a beam.

5. A beamformer according to claim 4 wherein said coupling means further comprises means connected between said summing means and said delaying means for weighting individual ones of said signal samples.

6. A beamformer according to claim 5 wherein said weighting means includes a memory addressed in common with said memory of said delaying means for selecting weighting coefficients corresponding to signal samples provided by said delaying means.

7. A beamformer according to claim 1 wherein said coupling means includes means for selecting samples having predetermined amounts of delay corresponding to the locations of respective transducers in said array for focussing a wavefront toward a focal point.

8. A beamformer for providing a beam from signals of an array of radiating elements, said beamformer comprising:
    means for sampling signals of individual ones of said radiating elements to provide samples of said signals;
    means for delaying said samples by increments of time which are smaller than the intersample interval between successive ones of said signal samples of any one of said radiating elements;
    a beamforming filter; and
    means for coupling a succession of said signal samples from each of said radiating elements to said filter, said filter combining said samples to produce said beam.

9. A beamformer according to claim 8 wherein said coupling means includes means for selecting individual ones of said samples having predetermined amounts of delay corresponding to the locations of respective transducers in said array for forming a beam in a predetermined direction.

10. In combination:
    means for providing a succession of samples of a signal from each of a plurality of sources of such signals;
    means for delaying said samples in increments of time which are smaller than the intersample interval between successive ones of said signal samples of any one of said sources; and
    filter means coupled to said delaying means for combining a succession of said samples from one of said sources with a succession of samples from a second of said sources.

11. A combination according to claim 10 further comprising means coupled between said delaying means and said filter means for selecting specific values of delays for said succession of samples from each of said sources.

* * * * *